US010552995B2

(12) United States Patent
Keys et al.

(10) Patent No.: US 10,552,995 B2
(45) Date of Patent: Feb. 4, 2020

(54) HIERARCHICAL INFORMATION VISUALIZER AND EDITOR (71) Applicant: OpenGov, Inc., Mountain View, CA (US)

(72) Inventors: Morgan Keys, Mountain View, CA (US); Gurdas Nijor, Fremont, CA (US); Matthew Seal, Sunnyvale, CA (US)

(73) Assignee: OPENGOV, INC., Redwood City, CA (US)

( * ) Notice: Subject to any disclaimer, the term of this patent is extended or adjusted under 35 U.S.C. 154(b) by 355 days.

(21) Appl. No.: 15/074,775

(22) Filed: Mar. 18, 2016

(65) Prior Publication Data
US 2017/0270697 A1 Sep. 21, 2017

(51) Int. Cl.
*G06F 17/22* (2006.01)
*G06T 11/20* (2006.01)
*G06F 3/0482* (2013.01)
*G06F 16/332* (2019.01)

(52) U.S. Cl.
CPC ........ *G06T 11/206* (2013.01); *G06F 17/2247* (2013.01); *G06F 3/0482* (2013.01); *G06F 16/3323* (2019.01); *G06F 17/227* (2013.01); *G06T 2200/24* (2013.01)

(58) Field of Classification Search
CPC .. G06F 3/0481; G06F 3/0482; G06F 17/2247; G06F 17/227; G06F 16/3323; G06T 11/20; G06T 11/206; G06T 2200/24
See application file for complete search history.

(56) References Cited

U.S. PATENT DOCUMENTS

2007/0252851 A1* 11/2007 Ogata ............... G06F 17/30038
345/619
2011/0055055 A1* 3/2011 Du ......................... G06Q 10/10
705/30
2015/0363478 A1* 12/2015 Haynes ............. G06F 17/30572
707/625

* cited by examiner

*Primary Examiner* — Rinna Yi
(74) *Attorney, Agent, or Firm* — Patterson & Sheridan, LLP (57) ABSTRACT Techniques are disclosed for generating a visualization of an organized hierarchy structure. An editor tool may receive, via a user interface displaying a graphical representation of a tree structure of a plurality of elements, a selection of an element. The tree structure is generated from a plurality of subtrees based on reference data associated with the underlying organized hierarchy structure. The editor tool identifies one or more hierarchy paths in the tree structure associated with the selected element. A visualization of the identified hierarchy paths is generated and presented via the user interface.

18 Claims, 8 Drawing Sheets

Segments

Funds
    Fund code
Departments
    Division code
        Activity1 code
Divisions
    Division code
        Activity2 code
Activities
    Activity code
Account Types
    Character code
        Object code
            Sub-Object code

305

Fund code

| Fund Category (3) | Fund Type (6) | Funds (33) |
|---|---|---|
| Governmental Funds | General Funds | General Account |
| Proprietary Funds | Special Revenue Funds | Central Depository |
| Fiduciary Funds | Debt Service | Cap. Reserve |
| | Enterprise Funds | Grant Projects |
| | Internal Services Funds | Revaluation |
| | Trust Fund | Fire Districts |
| | | [2025702] S. Obligation Bonus |
| | | [2024301] S. Obligation Loans |
| | | [2028801] Revenue Bonds |
| | | [2023609] G. Obligation Bonds |
| | | Sanitation |
| | | Water and Sewer |
| | | Central Regional Wastewater System |
| | | Airport |
| | | Stormwater |
| | | Parking System |

| Segments | Funds code | | | |
|---|---|---|---|---|
| | | Fund Category (3) | Fund Type (6) | Funds (33) |
| Funds | | Governmental Funds | General Funds | [2025702] S. Obligation Bonus |
| Fund code | | Proprietary Funds | Special Revenue Funds | [20243011] S. Obligation Loans |
| Departments | | Fiduciary Funds | Debt Service | [20288011] Revenue Bonds |
| Division code | | | Enterprise Funds | [20236091] G. Obligation Bonds |
| Activity1 code | | | Internal Services Funds | Sanitation |
| Divisions | | | Trust Fund | Water and Sewer |
| Division code | | | | Central Regional Wastewater System |
| Activity2 code | | | | Airport |
| Activities | | | | Stormwater |
| Activity code | | | | Parking System |
| Account Types | | | | [50543011] City Insurance |
| Character code | | | | [50545011] Health Benefits |
| Object code | | | | Vehicle Rental |
| Sub-Object code | | | | Central Services |
| | | | | Cemetery Perpetual Care |
| | | | | [60643011] Arts and Science |

305 — Segments/Funds
310 — Funds code
505 — Proprietary Funds

HIERARCHICAL INFORMATION VISUALIZER AND EDITOR

BACKGROUND

Field

Embodiments of the present disclosure generally relate to data management, and more specifically, to visualizing a hierarchical structure of data (e.g., for viewing and editing).

Description of the Related Art

Open data, the concept of making certain data freely available to the public, is of growing importance. For example, demand for government transparency is increasing, and in response, governmental entities release a variety of data to the public. One example relates to financial transparency, where city governments make budgets and other finances available to the public. This allows for more effective public oversight. For instance, a user can analyze the budget of a city to determine how much the city is spending for particular departments and programs. In addition, the user can compare budgetary data between different cities to determine, e.g., how much other cities are spending on respective departments. This latter example is particularly useful for a department head at one city who wants to compare spending, revenue, or budgets with comparable departments in other cities.

Financial and budgetary data for a given governmental entity is typically voluminous, which creates the need for data to be presentable to the user, such that the user can meaningfully analyze the data. To this effect, governmental entities use a chart of accounts to present financial data in an organized fashion. As known, a chart of accounts is a densely structured document that provides identifiable terminology and clearly defines hierarchies within a given city. A user may reference a chart of accounts to identify, e.g., budgetary and spending data of various departments. However, the user might only be concerned with a subsection of the chart of accounts, such as a department that he or she is affiliated with. Because the data provided by a chart of accounts can be complex and voluminous, the user may have difficulty navigating through the chart of accounts to reach any desired information.

SUMMARY

One embodiment presented herein discloses a method for generating a visualization of an organized hierarchy structure. This method generally includes receiving, via a user interface displaying a graphical representation of a tree structure of a plurality of elements, a selection of an element. The tree structure is generated from a plurality of subtrees based on reference data associated with the plurality of elements. The method also generally includes identifying one or more hierarchy paths in the tree structure associated with the selected element. A visualization of the identified hierarchy paths is generated and presented via the user interface.

Another embodiment presented herein discloses a non-transitory computer-readable storage medium having instructions, which, when executed on a processor, performs an operation for generating a visualization of an organized hierarchy structure. The operation itself generally includes receiving, via a user interface displaying a graphical representation of a tree structure of a plurality of elements, a selection of an element. The tree structure is generated from a plurality of subtrees based on reference data associated with the plurality of elements. The operation also generally includes identifying one or more hierarchy paths in the tree structure associated with the selected element. A visualization of the identified hierarchy paths is generated and presented via the user interface.

Yet another embodiment presented herein discloses a system having a processor and a memory storing code. The code, when executed on the processor, performs an operation for generating a visualization of an organized hierarchy structure. The operation itself generally includes receiving, via a user interface displaying a graphical representation of a tree structure of a plurality of elements, a selection of an element. The tree structure is generated from a plurality of subtrees based on reference data associated with the plurality of elements. The operation also generally includes identifying one or more hierarchy paths in the tree structure associated with the selected element. A visualization of the identified hierarchy paths is generated and presented via the user interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein disclose techniques for visualizing a structured hierarchy of data. More specifically, embodiments provide a user interface (UI) application that presents a graphical representation of complex hierarchies of data for, e.g., viewing and editing by an individual. In one embodiment, the UI application may present a hierarchical tree in columnar slots, where each column represents a given depth level of the tree. Further, the UI application allows a user to scroll through each column independently to view hierarchical elements within. Because elements in a hierarchy can be numerous, presenting elements of a given depth level in separate columns allows the user to easily scroll through a column to easily view elements at that depth level.

Further still, in one embodiment, the UI application allows a user to identify hierarchy paths for a given element on-demand. For instance, the UI application may receive a selection of an element in one of the columns. The UI application identifies each hierarchy path associated with that selected element. To do so, the UI application may traverse the underlying hierarchy tree to discover paths leading to ancestors and descendants associated with the selected element. Once identified, the UI application generates a visualization of the identified hierarchical paths to be presented through the interface. For example, the UI application may automatically scroll each column and highlight the ancestors or descendants associated with the selected element, allowing the user to readily view paths leading to and following from the element.

In one embodiment, the hierarchy presented by the UI application is built by transforming parent tree structures of the hierarchy into a single tree. In this case, the independent trees have leafs that are referenced by other external data sources, where the external data sources provide dependent tree information for the tree. In one embodiment, a hierarchy builder associates leaf nodes of a parent tree with root nodes of the dependent tree that have some relation with one another.

For example, embodiments presented herein may be adapted to a financial transparency application that provides an editor tool for a chart of accounts of an entity, e.g., a city or municipal government, to an individual. Generally, a chart of accounts presents a hierarchical view of the entity's financial and budgetary accounts. In this case, the editor tool may provide a graphical representation of the chart of accounts in columnar slots, where each slot represents levels of a given hierarchy in the chart of accounts (e.g., a Funds hierarchy, a Departments hierarchy, etc.). For example, a slot for a Funds hierarchy may specify types of funds for the entity, such as General Funds, Proprietary Funds, Disaster Funds, etc. The next slot may provide more specific categories for each of the types. And the next slot may specify codes of accounts associated with those categories. The editor tool provides an organized view that an individual can more easily browse. In addition the editor tool may allow the individual to modify the chart of accounts, e.g., dragging leaf elements to other parts of a given hierarchy, renaming hierarchy elements, etc.

Generally, a chart of accounts may be voluminous. For example, the chart of accounts may include numerous account codes, and determining which account code is associated with which department (or fund, division, etc.) can present some difficulty for the individual. For example, a Police Chief may only be concerned with account codes for a Police Department and be less concerned with account codes in other departments, such as account codes of a Water Department.

In one embodiment, the editor tool generates a visualization of hierarchy paths associated with a selected element in the chart of accounts display, such as an account code, department title, division title, and so on. For example, when an individual selects a given account code, the editor tool may automatically scroll each of the columns of the user interface and highlight hierarchical elements (e.g., a Fund type and a Fund sub-type) associated with that account code. As another example, if an individual selects a given department title, the editor tool may automatically scroll each of the columns of the user interface and highlight hierarchical elements associated with the department, such as divisions and account codes under that particular department.

In one embodiment, to do so, the editor tool may traverse an underlying hierarchy tree for the chart of accounts to identify each ancestor and descendant associated with the selected element. By doing so, the editor tool identifies the hierarchy paths associated with the element and visualizes those hierarchy paths via the user interface. As a result, the individual may readily identify elements in the chart of accounts hierarchy that are relevant to a selected element.

The financial transparency application imports the chart of accounts as multiple subtrees, where a given subtree may be related to another (e.g., a subtree B depends from a subtree A). As a result, a chart of accounts, as imported, may include a number of separate label hierarchies identified by separate account codes. Further, associations between certain hierarchical elements are not immediately apparent in the chart of accounts. For example, a chart of accounts does not typically specify associations between an activity code and a division code. In one embodiment, a hierarchy builder may generate the hierarchy for a given entity from the entity's chart of accounts and reference data such as a general ledger.

In particular, the hierarchy builder models a number of subtrees from the charts of accounts and reference data. The subtrees provide an abbreviated form of a larger hierarchy and further can be reused with respect to portions of the hierarchy that use similar labels or account codes. For example, the hierarchy of an Administration division of a Finance department may be identical to the hierarchy of an Administration division in a Treasury department, even if both Administration divisions are completely unrelated.

In one embodiment, the hierarchy builder generates a unified hierarchy tree from the parent and dependent trees submitted as input to the hierarchy builder. The hierarchy builder may receive dependent subtrees. Further, the hierarchy builder identifies the leaf nodes in a given parent tree. And for each leaf node, the hierarchy builder determines relationships between a leaf node and a root node of a dependent tree using the reference data. For instance, the hierarchy builder may evaluate rows of a general ledger associated with the chart of accounts. The row may reference account codes that, in turn, may indicate a relationship between a leaf node of a parent subtree and a root node of a dependent subtree. If a given leaf node relates to the root node of a dependent tree, the hierarchy associates the leaf node to that root. The hierarchy builder may continue to identify such relationships recursively through that dependent tree. Once all associations are identified, the hierarchy builder can generate the unified tree from such associations. In turn, the editor tool may use the unified tree as part of the user interface. Further, the editor tool may allow the individual to create additional associations via the user interface. For example, the individual can select an element from each of two separate columns to manually create an association.

Advantageously, embodiments presented herein provide an editing tool that allows an individual to identify, on demand, hierarchical data associated with a selected element in a complex hierarchy structure, such as a chart of accounts. This eliminates the need for the individual to sift through the entire hierarchy to find a given element. Further, the editing tool leverages an underlying hierarchy tree built from a number of separate subtrees. The hierarchy builder identifies relationships between a given parent tree to a dependent subtree based on reference data. Because these relationships are defined in advance to the individual selecting a given element, performance in the editing tool is improved.

Note, an editing tool configured to view and modify a chart of accounts is used as a reference example for identifying hierarchy paths for a selected element in a complex hierarchical structure. However, one of skill in the art will recognize that embodiments presented herein may be adapted to various multidimensional data sets that can be organized into a complex hierarchy. For example, a unified tree hierarchy can be built from independent data sets of speciation information, and likewise can be presented in an editor/viewer tool that an individual can navigate through. The example tool can traverse the unified tree upon selection of a given speciation element within a user interface provided by the tool.

Figure 1:
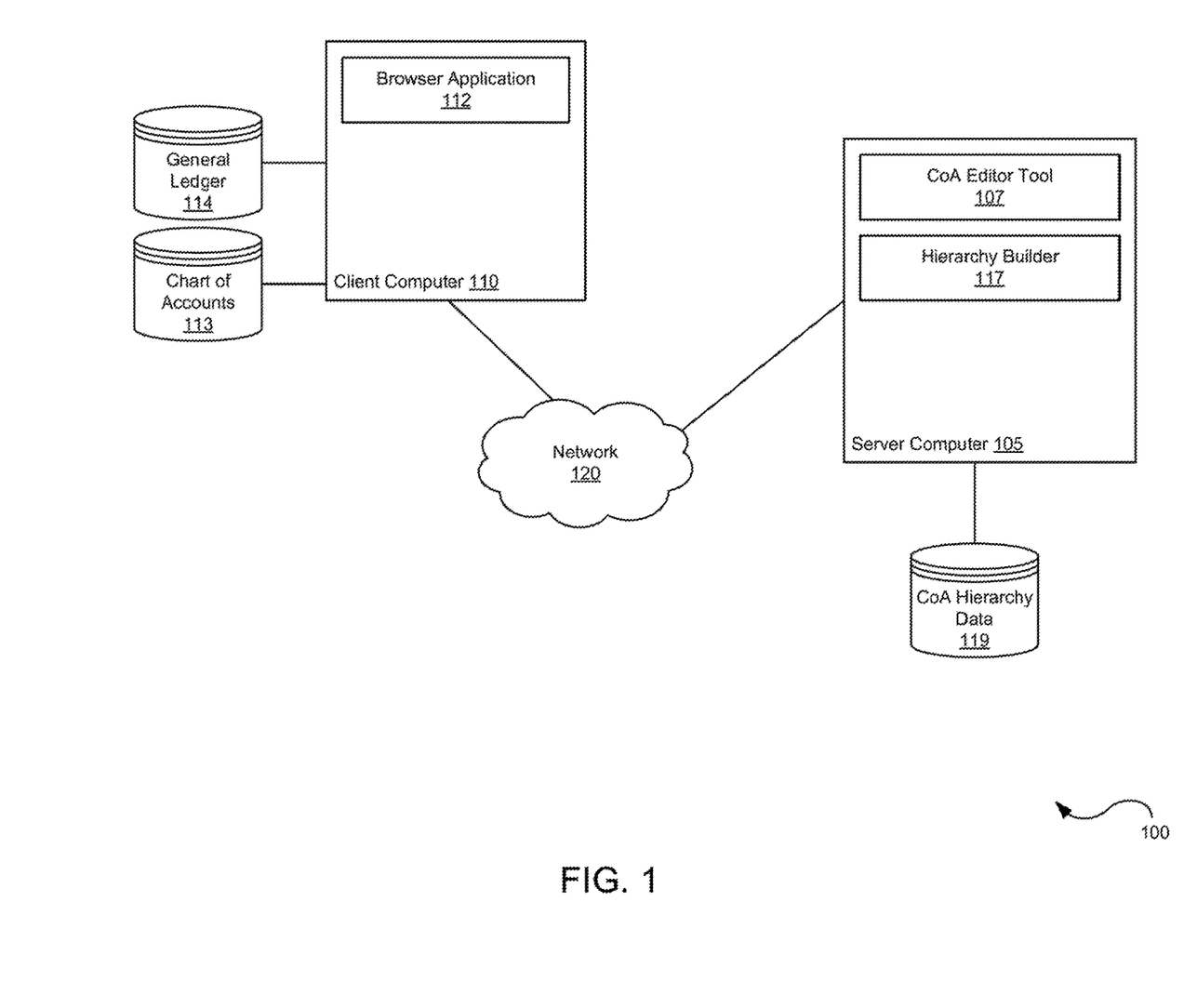
FIG. 1 illustrates an example computing environment, according to one embodiment.

FIG. 1 illustrates an example computing environment 100, according to one embodiment. As shown, the computing environment 100 includes a server computer 105 and a client computer 110 each connected via a network 120. The server computer 105 may be a physical computing system (e.g., a system in a data center) or a virtual computing instance executing within a computing cloud. In one embodiment, the server computer 105 hosts a chart of accounts (CoA) editor tool 107 and a hierarchy builder 117. The CoA editor tool 107 and the hierarchy builder 117 may collectively be a part of a financial transparency application that allows a user (e.g., an administrator, city planner, citizen, etc.) to browse budgetary data of different state and local governments, e.g., through a chart of accounts (e.g., a chart of accounts 116 corresponding to an entity). Generally, a chart of accounts is a densely structured document that provides identifiable terminology and clearly defines hierarchies within an organization, such as a city government.

In one embodiment, the CoA editor tool 107 allows an individual to view and modify a chart of accounts. For example, the individual may use the CoA editor tool 107 via a user interface accessible by a browser application 112 executing on a client computer 110. Further, the individual (e.g., a finance administrator of a municipality) may upload a chart of accounts 113 (corresponding to a chart of accounts for that municipality) and other reference data relating to the chart of accounts 113, such as a general ledger 114, to the server computer 105. In turn, the financial transparency application imports the chart of accounts 113 as multiple hierarchical subtrees (CoA hierarchy data 119). The corresponding chart of accounts 116 that the CoA editor 107 displays includes a number of separate label hierarchies that are identified by separate account codes. Account codes in a chart of accounts may include department codes, division codes, activity codes, and the like. However, the dependencies of a given account code subtree to another element in the hierarchy (e.g., a division code subtree) are typically not immediately apparent.

In one embodiment, reference data, such as the general ledger 114, may provide context between a given subtree with another. As known, a general ledger is a complete record of transactions of an entity. A row in the general ledger 114 may specify information including a data of a transaction, an amount of the transaction, and an account code that may indicate a group associated with the transaction. Further, the row can indicate that a relationship exists between a given subtree with another subtree, e.g., the ledger row may reference a division code (e.g., corresponding to Treasury) with an activity code (e.g., corresponding to Administration).

In one embodiment, the hierarchy builder 117 uses input reference data to the chart of accounts 113 (e.g., the general ledger 114) to transform the subtrees into a unified tree. As further described below, the hierarchy builder 117 may identify leaf nodes in a given subtree and determine relationships to a dependent subtree that may exist between the leaf node and root node of that dependent subtree. The hierarchy builder 117 constructs the unified tree from associations between subtrees having leaf node and root node relationships, as determined from the reference data.

In one embodiment, the CoA editor 107 presents the chart of accounts 113 in a columnar slot format. Each column represents a given level of the hierarchy data 119. Of course, the CoA editor 107 may present the chart of accounts 113 using other manners to convey the hierarchical data 119 can be used. An individual may select a given hierarchical element, and the CoA editor 107 may present a visualization of identified hierarchy paths associated with that selected element. To do so, the CoA editor 107 may traverse the unified tree generated from the hierarchy data 119, which includes all paths, as determined by the hierarchy builder 117.

Figure 2:
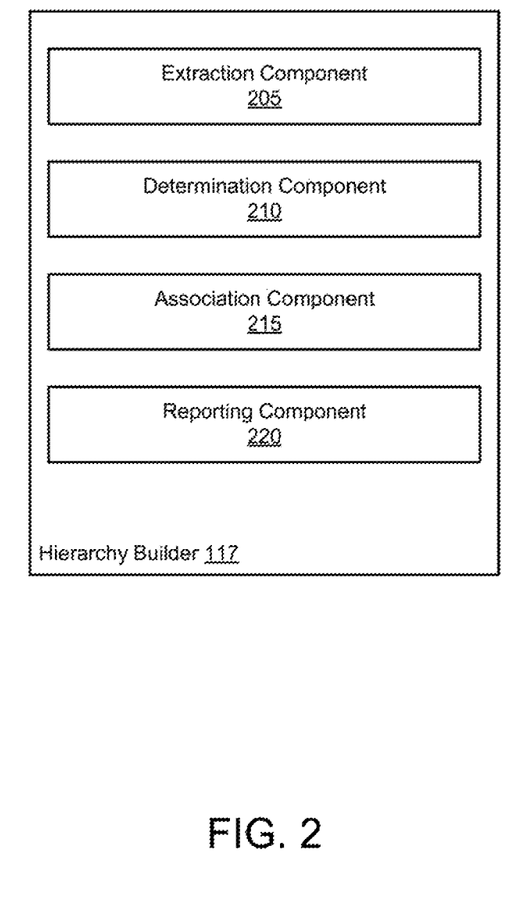
FIG. 2 further illustrates the ontology application described relative to FIG. 1, according to one embodiment.

FIG. 2 further illustrates the hierarchy builder 117, according to one embodiment. As shown, the hierarchy builder 117 includes an extraction component 205, a determination component 210, an association component 215, and a reporting component 220.

In one embodiment, the extraction component 205 receives reference data associated with a particular chart of accounts. As stated, the reference data can include a general ledger file. The extraction component 205 retrieves row entry data from the general ledger, such as account code information provided in a given row entry.

In one embodiment, the determination component 210 evaluates the hierarchy data 119 relative to the row entry data of the general ledger. In particular, the determination component 210 evaluates a parent subtree to identify properties of each leaf node, such as account code information (e.g., a specified department code, division code, etc.). In addition, the determination component 210 evaluates the general ledger data to identify entries that reference the node properties. If identified, the association component 215 may determine whether the general ledger entry references another code corresponding to a root node in another subtree. In such a case, the association component 215 defines a relationship between the leaf node and the root node. The association component 210 replicates the root node of the subtree and joins the root node against the leaf node of the parent tree. In one embodiment, the hierarchy builder 117 may recursively associate the relationships. For instance, once a related root node of that subtree is identified, the association component 210 may walk down to the leaf nodes of that subtree to define relationships from those leaf nodes to root nodes of other subtrees.

Figure 3:
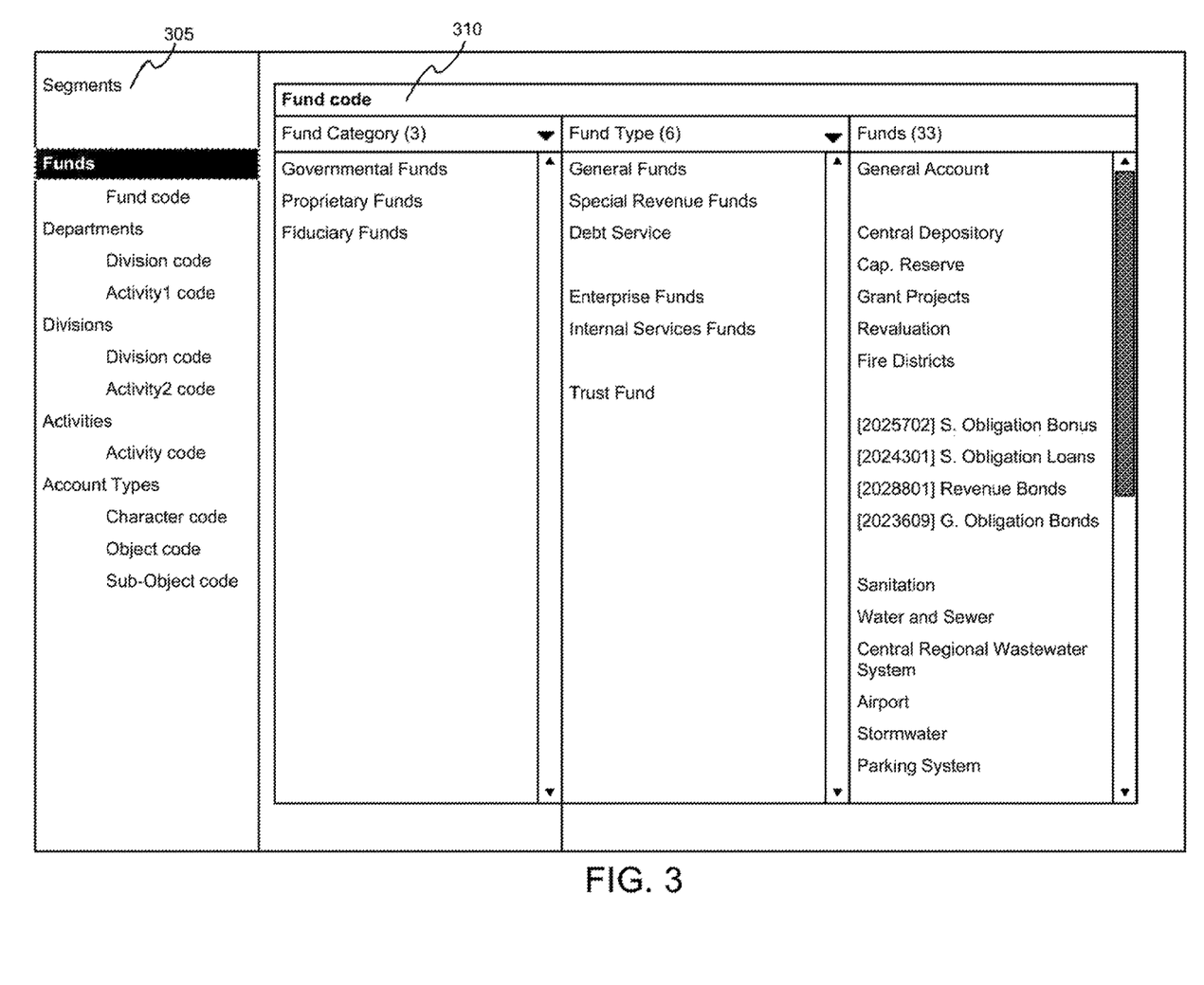
FIG. 3 illustrates an example user interface configured to visualize hierarchical data, according to one embodiment.

In one embodiment, the reporting component 215 sends the unified tree formed from the hierarchy data 119 to the CoA editor tool 107. In turn, the CoA editor tool 107 may generate a graphical representation of the hierarchy data 119. For example, FIG. 3 illustrates an example user interface of the CoA editor 107, according to one embodiment. Illustratively, the user interface provides a file folder-like structure presenting the overall chart of accounts hierarchy, based on the underlying hierarchy data 119.

For instance, the user interface includes a Segments panel 305, which lists labels in the chart of accounts and organizes the labels in a hierarchical fashion (e.g., an indented label represents a child relationship to a label that is not indented). Illustratively, panel 305 displays a number of hierarchical components, such as "Funds," "Departments," "Divisions," "Activities," and "Account Types." Each of the components may be associated with other hierarchical components. For example, the "Funds" hierarchy may include a "Fund code" sub-hierarchy, where "Fund code" is a child to "Funds."

As an example, the user interface displays the "Fund code" hierarchy in panel 310. The panel 310 includes three columns labeled "Fund Category," "Fund Type," and "Funds." Each column represents a level of hierarchy in succession, where "Funds" is the lowest level in the hierarchy. Further, each column includes one or more labels that correspond to a given element in the hierarchy level. For example, the first column for "Fund Category" provides three different category labels, "Governmental Funds," "Proprietary Funds," and "Fiduciary Funds." And the second column for "Fund Type" provides six different type labels, "General Funds," "Special Revenue Funds," "Debt Service," "Enterprise Funds," "Internal Services Funds," and "Trust Fund."

Figure 4:
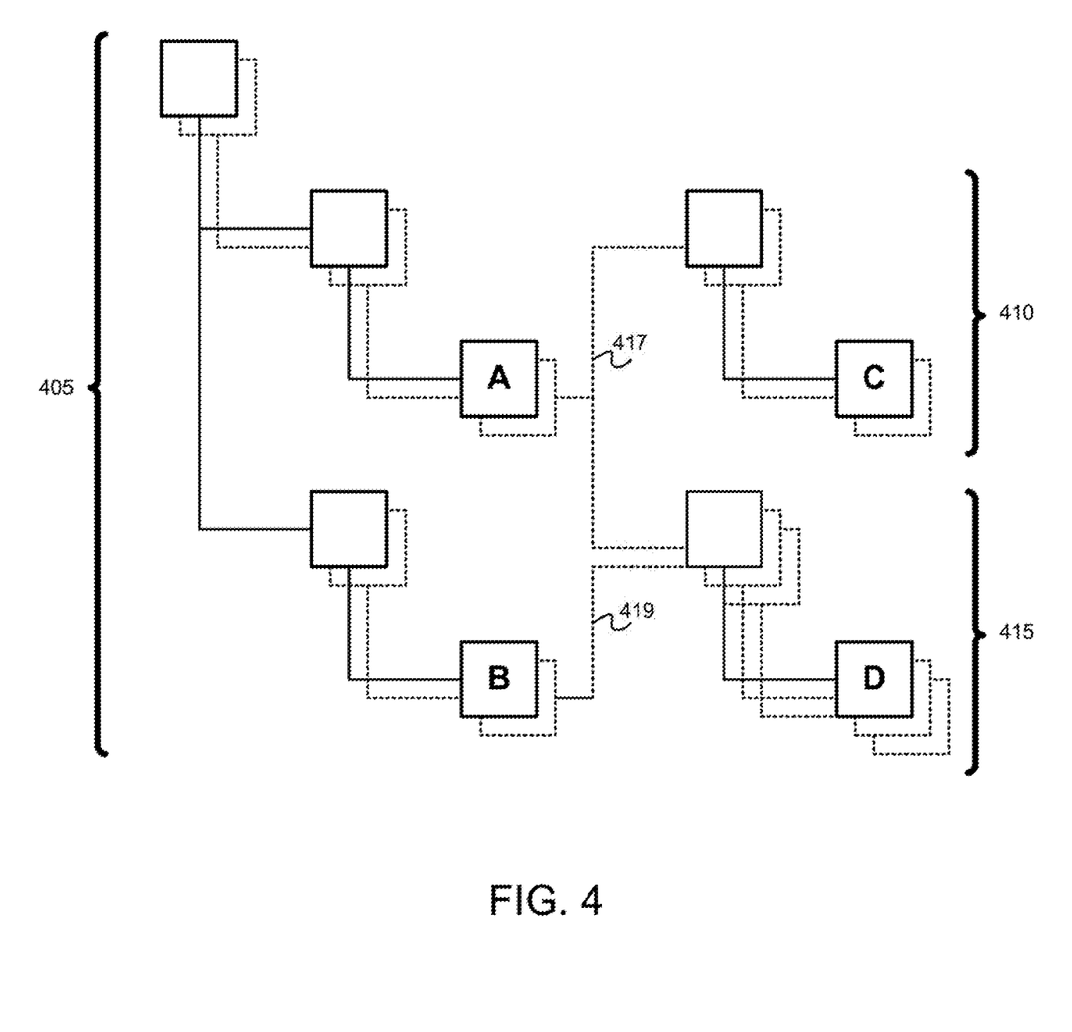
FIG. 4 illustrates an example for identifying hierarchical relationships between subtrees based on reference data, according to one embodiment.

Note that the second column in panel 310 separates distinct hierarchical groups, e.g., using double spaces, as shown. Each hierarchical group may correspond to an underlying subtree in the unified tree and likewise each element may be associated with a particular hierarchical group in another level of the hierarchy. FIG. 4 illustrates an example of discovering relationships between subtrees of a complex hierarchical structure, according to one embodiment. In this example, FIG. 4 depicts three subtrees 405, 410, and 415, where 405 represents a parent subtree and 410 and 415 represent dependent subtrees. In one embodiment, the designation of parent and dependent subtrees is assigned based on the import source for the chart of accounts.

The solid-lined boxes in each of the subtrees 405, 410, and 415 represent node properties of an underlying node, where each node is represented by the dotted-lined boxes. The dotted lines connecting from one node to another represents a realization of a relationship between the nodes based on the node properties—the nodes are joined together by association. Note that each subtree has lettered node properties A, B, C, and D, used to illustrate this example. Each of the lettered node properties may correspond to a given chart of accounts definition label in the hierarchy data 119. In this example, assume that A corresponds to a Finance department, B corresponds to Fire Department, C corresponds to Billing Services, and D corresponds to Administration.

As stated, the hierarchy builder 117 evaluates reference data, such as rows in the general ledger, to identify relationships between node properties. For example, a given row in the general ledger may reference account codes corresponding to Finance and Billing Services. In such a case, the hierarchy builder 117 associates those underlying nodes with one another, by connecting the leaf node of the subtree 405 to the root node of subtree 410 (as represented by the dotted line 417). The association represents that the node having a Billing Services property is dependent on the node having a Finance property. As another example, another ledger row may reference account codes corresponding to Finance and Administration, and likewise, the hierarchy builder 117 associates the underlying nodes with one another, by connecting the leaf node of the subtree 405 to the root node of subtree 415 (as also represented by the dotted line 417).

As yet another example, a ledger row may reference account codes corresponding to Fire and Administration, and the hierarchy builder 117 associates the underlying nodes with one another (as represented by the dotted line 419). Note, that both Finance and Fire both associate to the Administration node. In such a case, even though the Administration divisions of the Finance and Fire departments are both distinct entities, the Administration label and the hierarchy structure are identical.

Figure 5:
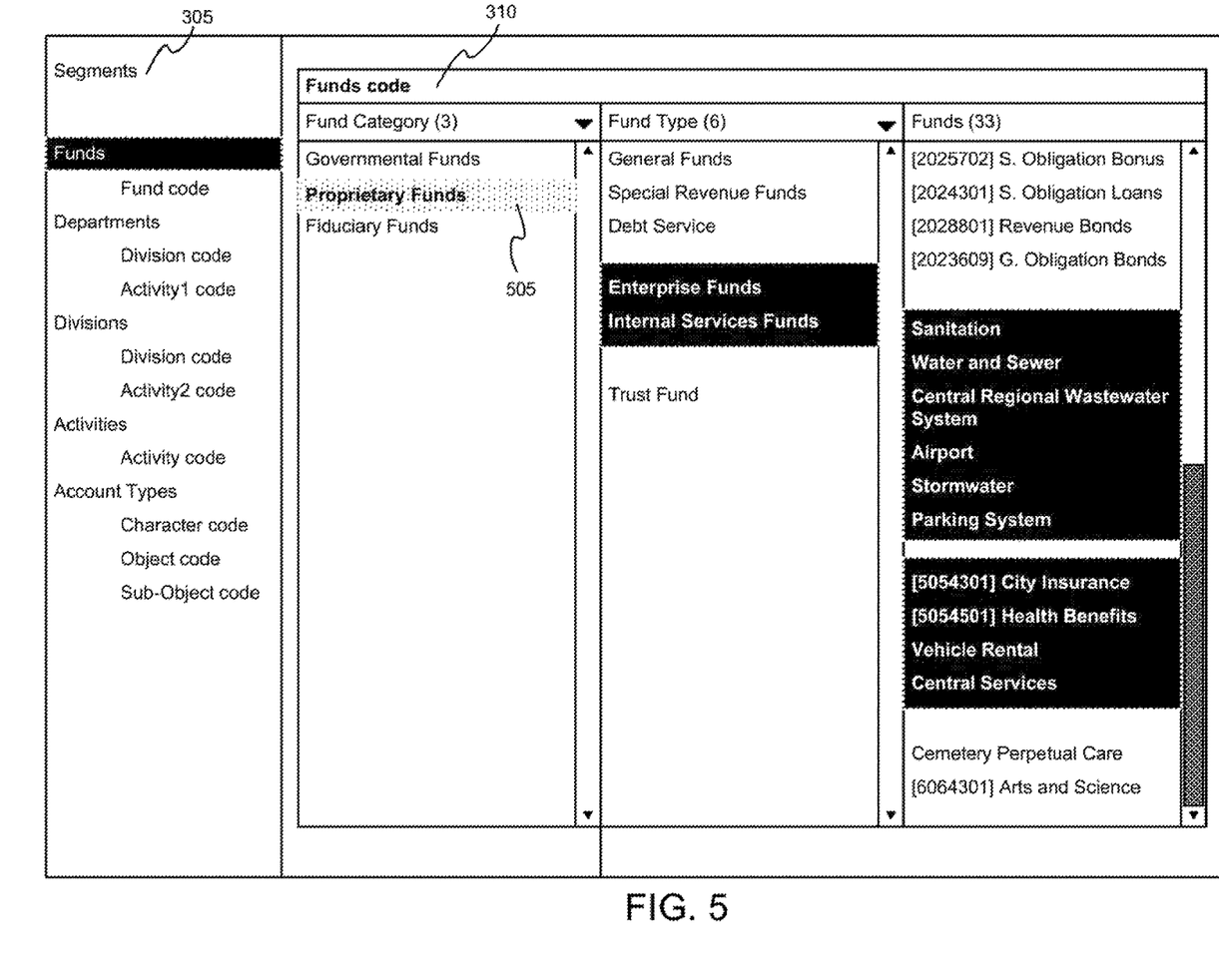
FIG. 5 further illustrates the example user interface described relative to FIG. 3, according to one embodiment.

By identifying underlying relationships between distinct hierarchy components, the hierarchy builder 117 can construct the unified tree that the CoA editor 107 may traverse to identify hierarchy paths associated with a given element in the tree. FIG. 5 illustrates an example of the user interface first described relative to FIG. 3, in one embodiment. In this example, assume that a user selects the "Proprietary Funds" category in the first column in panel 310 (at 505).

In such a case, the CoA editor tool 107 traverses the unified tree, starting from the node corresponding to the "Proprietary Funds" label. The CoA editor tool 107 identifies hierarchy paths, ancestors, and descendants, associated with the "Proprietary Funds" element during the traversal. The CoA editor tool 107 may then generate a visualization of the identified hierarchy paths. For example, as depicted in FIG. 5, the CoA editor tool 107 highlights hierarchy groups in the Fund Type and Funds columns in the panel 310. The highlighted groups represent hierarchy elements in the hierarchical path associated with the "Proprietary Funds" element. Advantageously, the individual may readily view relevant fund types and fund accounts associated with a given fund category.

Figure 6:
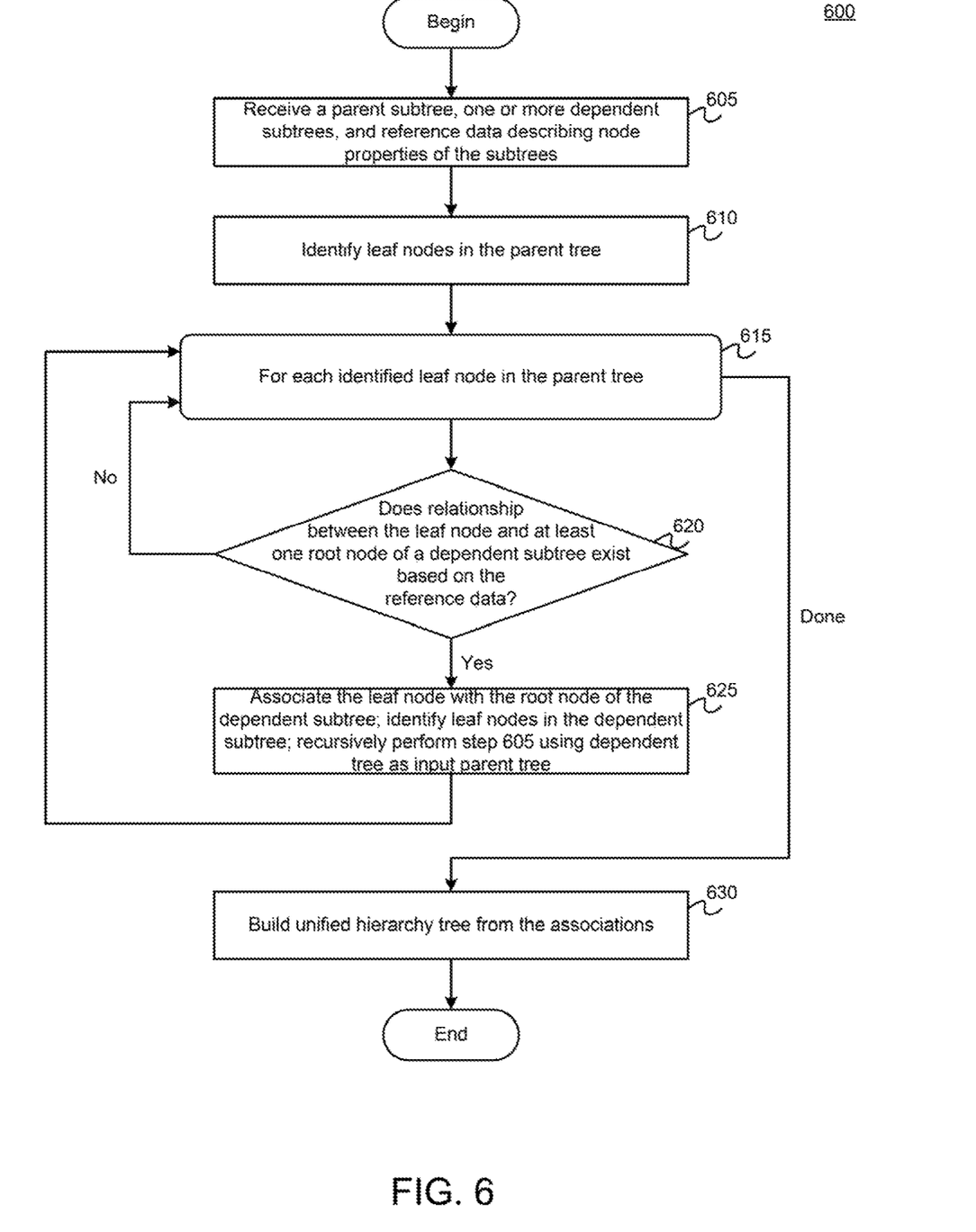
FIG. 6 illustrates a method for transforming independent tree structures into a cohesive structure, according to one embodiment.

FIG. 6 illustrates a method 600 for transforming independent tree structures into a cohesive structure, according to one embodiment. As shown, method 600 begins at step 605, where the extraction component 205 receives a parent subtree, one or more dependent subtrees, and reference data as input. As stated, the reference data includes general ledger data that references node properties of the subtrees.

At step 610, the evaluation component 210 identifies leaf nodes in the parent tree. At step 615, the method 600 performs steps 620 and 625 for each identified leaf node in the parent tree. At step 620, the evaluation component 210 determines whether a relationship between the leaf node and at least root node of a dependent subtree exists based on the general ledger data. As stated, to do so, the evaluation component 210 may determine whether a given ledger row references the account codes associated with the leaf node of the parent and the root node of the dependent subtree. If not, the evaluation component 210 proceeds with performing step 620 on the next identified leaf node (if present).

Otherwise, at step 625, the association component 215 joins the leaf node of the parent subtree with the root node of the dependent subtree. To do so, the association component 215 may replicate the root node to join against the leaf node of the parent tree. Further, the evaluation component 210 identifies any leaf nodes in the dependent subtree. Doing so allows the hierarchy builder 117 to recursively perform step 605 using the dependent subtree as an input parent. After the associations are discovered for each of the leaf nodes in the parent tree, at step 630, the association component 215 builds the unified hierarchy tree from joined nodes. The reporting component 220 may send the unified tree to the CoA editor tool 107, where in turn, the CoA editor tool 107 displays a graphic representation of the resulting unified tree via the user interface.

Figure 7:
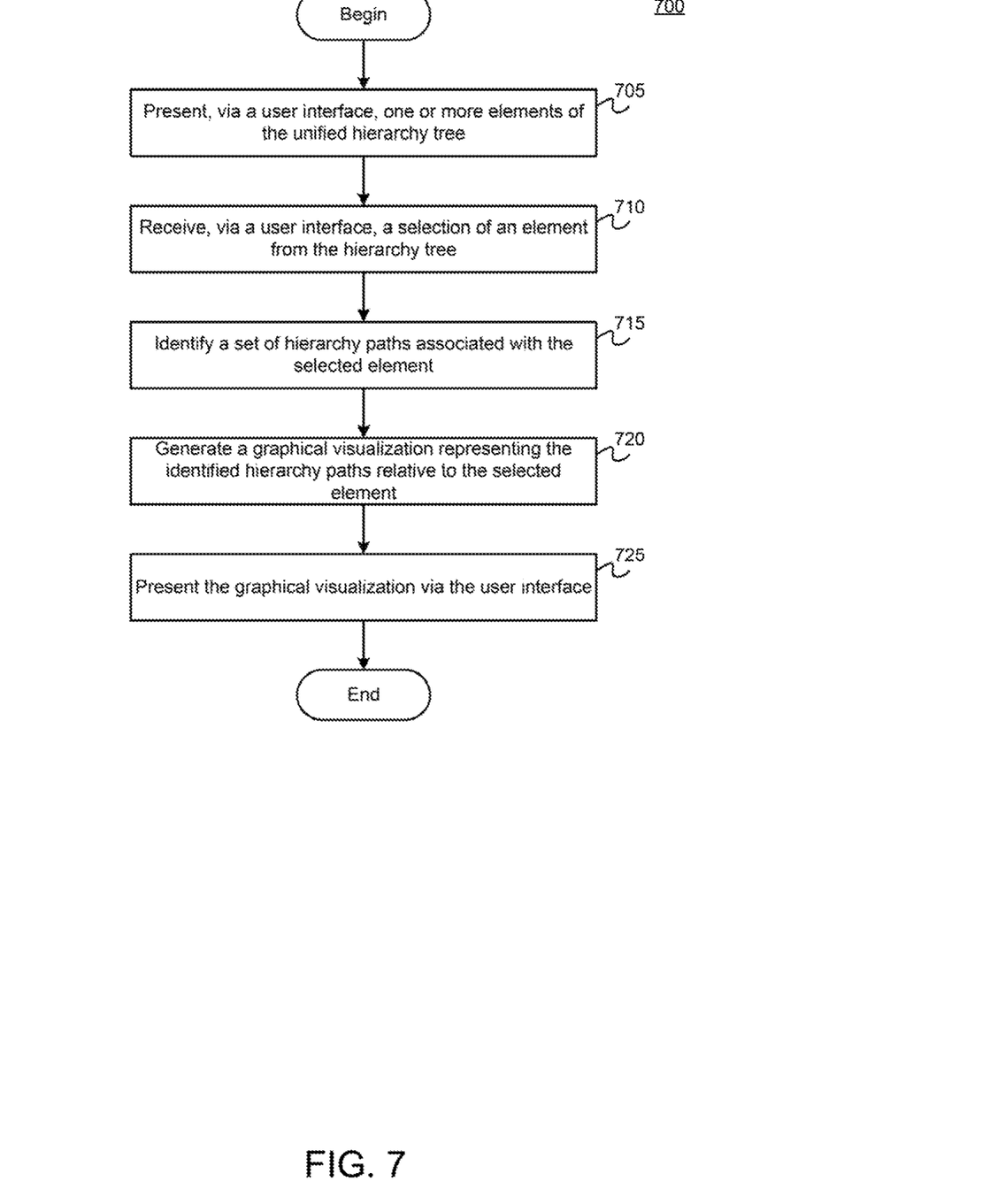
FIG. 7 illustrates a method for generating a graphical representation of a subset of a hierarchical structure, according to one embodiment.

FIG. 7 illustrates a method 700 for generating a graphical representation of a subset of hierarchical data, according to one embodiment. As shown, method 700 begins at step 705, where the CoA editor tool 107 presents, via a user interface, one or more elements of the unified hierarchy tree. For example, the one or more elements may be presented as the user interface depicted in FIGS. 3 and 5. The elements each correspond to a given position in the unified hierarchy tree.

At step 710, the CoA editor tool 107 receives, via the user interface, a selection of an element from the unified hierarchy tree. For example, an individual may click on one of the elements presented via the user interface. The CoA editor tool 107 receives that selection. At step 715, the CoA editor tool 107 identifies a set of hierarchy paths associated with that selected element. The set includes paths leading to parents and children that have been observed to be related (e.g., by the association component 215) with the selected element.

At step 720, the CoA editor tool 107 generates a graphical visualization representing the identified hierarchy paths relative to the selected element. For example, the CoA editor tool 107 may "slide" each of the columns of the user interface to reach each of the associated hierarchy elements and highlight the elements thereafter. At step 725, the CoA editor tool 107 presents the graphical visualization via the user interface. Doing so allows the individual to easily view chart of accounts elements and the structured hierarchy associated with the selected element.

Figure 8:
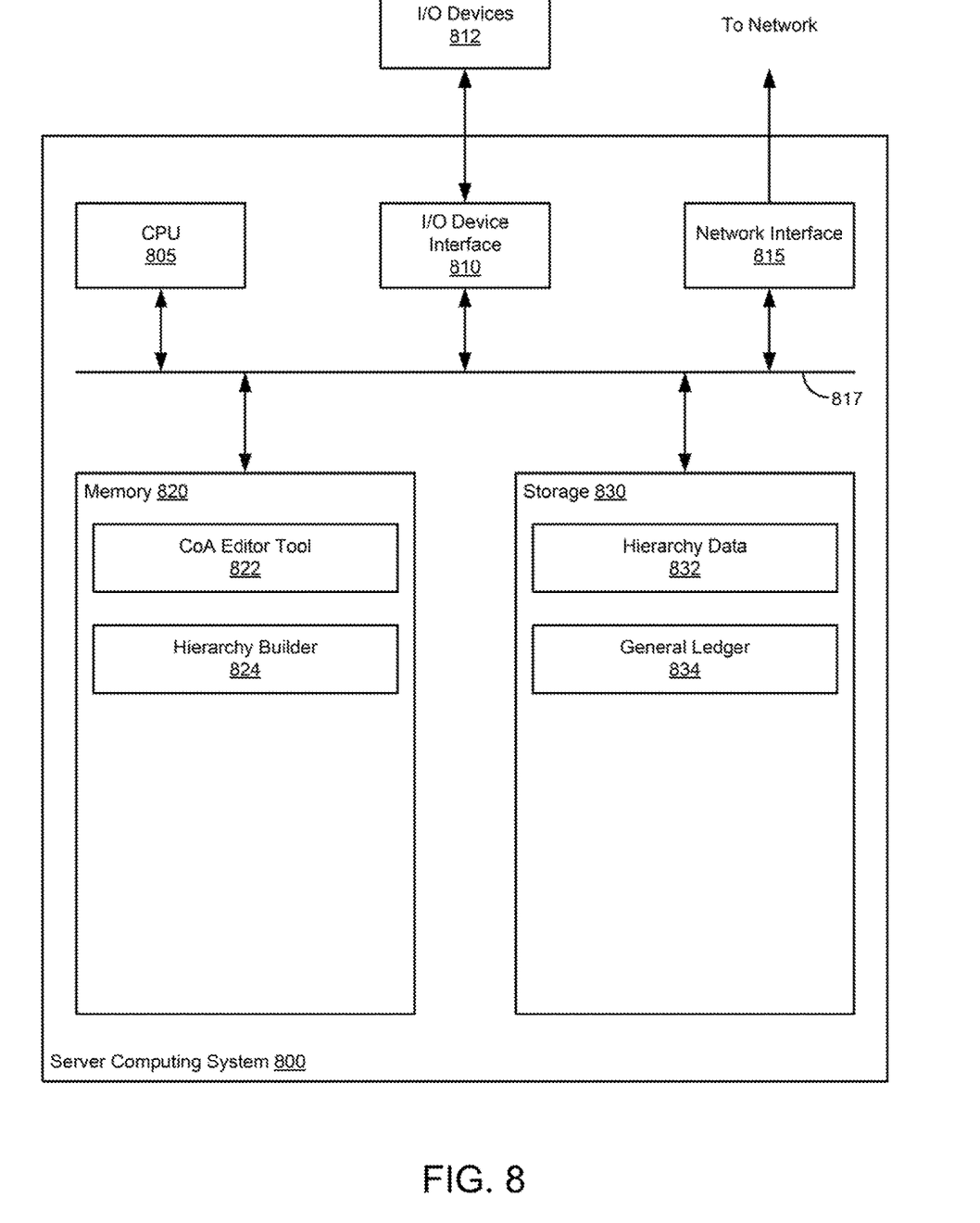
FIG. 8 illustrates an example computing system configured to present a graphical visualization of hierarchical data, according to one embodiment.

FIG. 8 illustrates an example computing system 800 configured to present a graphical visualization of hierarchical data, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the storage 830. The interconnect 817 is used to transmit programming instructions and application data between the CPU 805, I/O devices interface 810, storage 830, network interface 815, and memory 820. Note, the CPU 805 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 630 may be a combination of fixed and/or removable storage devices, such as fixed disc drives, removable memory cards, or optical storage, network attached storage (NAS), or a storage area-network (SAN).

Illustratively, the memory 820 includes a chart of accounts (CoA) editor tool 822 and a hierarchy builder 824, which both may collectively form a financial transparency application that includes a number of other software applications configured to process budgetary data belonging to local governments and presents the data to a user through graphs and other analytics. And the storage 830 includes hierarchy data 832 (representing a chart of accounts) and a general ledger 834. The hierarchy builder 824 transforms multiple distinct subtrees in the hierarchy data 832 into a unified hierarchy tree using various reference data associated with the chart of accounts, e.g., the general ledger 824. For instance, the hierarchy builder 824 may evaluate properties of leaf nodes (e.g., labels and account codes associated with the node) of a given parent tree and identify, by reference to the general ledger 834, root nodes of dependent subtrees being related to the leaf nodes. The hierarchy builder 924 may recursively perform this process on input subtrees to generate the unified tree.

In one embodiment, the CoA editor tool 822 generates a graphical representation of the unified hierarchy tree via a user interface. For example, the graphical representation may present the hierarchy tree in columnar slots, where each slot represents a depth level in a given hierarchy. The user may select one of the elements in a given slot. Once selected, the CoA editor tool 822 may traverse the hierarchy tree to identify any hierarchical paths associated with the selected element. Once identified, the CoA editor tool 822 may generate a visualization of those hierarchy paths, e.g., by "slotting" the columns and highlighting elements associated with the hierarchy paths.

In the preceding, reference is made to embodiments of the present disclosure. However, the present disclosure is not limited to specific described embodiments. Instead, any combination of the following features and elements, whether related to different embodiments or not, is contemplated to implement and practice the embodiments. Furthermore, although embodiments presented herein may achieve advantages over other possible solutions and/or over the prior art, regardless of whether a particular advantage is achieved by a given embodiment is not limiting of the embodiments disclosed herein. Thus, the following aspects, features, embodiments and advantages are merely illustrative and are not considered elements or limitations of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer-readable medium(s) may be used. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples a computer-readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer-readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture, e.g., servers, storage, networks, enabling convenient, on-demand network access to a shared pool of configurable computing resources that can be rapidly provisioned and released with minimal management effort or service provider interaction. Thus, cloud computing allows a user to access virtual computing resources, e.g., storage, data, applications, and even complete virtualized computing systems in "the cloud," without regard for the underlying physical systems, or locations of those systems, used to provide the computing resources. A user can access any of the resources that reside in the cloud at any time, and from anywhere across the Internet. In context of the present disclosure, an application hosted on a cloud-based server may be configured to generate unified hierarchy tree data from a subtree data corresponding to a given chart of accounts. That is, the cloud-based server could send code and data needed to allow a client to service its own request. Doing so reduces the data processing requirements on the server, which, in turn, allows the server to process more requests and reduce the number of deployed instances of cloud-based servers required to process the hierarchy data.

While the foregoing is directed to embodiments presented herein, other and further embodiments may be devised without departing from the basic scope thereof, and the scope thereof is determined by the claims that follow.

What is claimed is:

1. A method for generating a unified tree structure to present a visualization of a plurality of elements in an organized hierarchy structure, the method comprising:
   receiving a data set comprising:
      a parent subtree;
      a plurality of dependent subtrees; and
      reference data associated with the plurality of elements describing properties of the parent subtree and the plurality of dependent subtrees;
   identifying a plurality of leaf nodes in the parent subtree;
   determining a first set of relationships between each leaf node in the parent subtree and at least one root node in a first dependent subtree of the plurality of dependent subtrees based on the reference data;
   identifying each leaf node in each dependent subtree of the plurality of dependent subtrees;
   determining a second set of relationships between each leaf node in each dependent subtree of the plurality of dependent subtrees and at least one root node in a subset of dependent subtrees of the plurality of dependent subtrees;
   generating the unified tree structure based on the first set of relationships and the second set of relationships, the unified tree structure comprising a plurality of levels;
   displaying a graphical user interface on a display device, wherein:
      the graphical user interface comprises at least a first column, a second column, and a third column,
      each of the first column, the second column, and the third column represents a different level of the plurality of levels of the unified tree structure,
      each of the first column, the second column, and the third column includes a scroll function,
      each of the first column, the second column, and the third column comprises one or more elements, and
      each respective element of the one or more elements within each respective column of the first column, the second column, and the third column is associated with one or more of an ancestor element or a descendant element, based on a level of the respective column in the unified tree structure;
   receiving, via the graphical user interface, a first user input selecting a first element from one of the first column, the second column, or the third column;
   identifying one or more hierarchy paths associated with the selected first element in the unified tree structure, wherein the one or more hierarchy paths comprise:
      all elements associated with the selected first element; and
      at least one related ancestor element, at least one related descendent element, or at least one related ancestor element and at least one related descendent element based on a level of a column associated with the selected first element;
   generating a visualization of the identified one or more hierarchy paths associated with the selected first element by:
      automatically scrolling one or more of the first column, the second column, and the third column to view in the graphical user interface on the display device the at least one related ancestor element, the at least one related descendent element, or the at least one related ancestor element and at least one related descendent element based on the level of the column associated with the selected first element; and
      highlighting the at least one related ancestor element, the at least one related descendent element, or the at least one related ancestor element and at least one related descendent element based on the level of the column associated with the selected first element.

2. The method of claim 1, wherein each of the first column, the second column, and the third column corresponds to a hierarchy in a chart of accounts of an entity.

3. The method of claim 2, wherein the elements in the chart of accounts comprises a hierarchical structure of the entity's financial accounts.

4. The method of claim 1, wherein each of the first column, the second column, and the third column comprises a plurality of hierarchical groups, and wherein each hierarchical group of the plurality of hierarchical groups relates to the parent subtree or a subtree from the plurality of dependent subtrees.

5. The method of claim 1, further comprising:
   receiving, via the graphical user interface, a second user input selecting a second element from one of the first column, the second column, or the third column; and creating a new relationship between a node associated with the first element and a node associated with the second element in the unified tree structure.

6. The method of claim 5, further comprising:
identifying one or more hierarchy paths associated with the selected second element in the unified tree structure; and
generating a visualization of the identified one or more hierarchy paths associated with the selected second element.

7. A non-transitory computer-readable storage medium storing instructions, which, when executed on a processor, performs an operation for generating a unified tree structure to present a visualization of a plurality of elements in an organized hierarchy structure, the operation comprising:
receiving a data set comprising:
a parent subtree;
a plurality of dependent subtrees; and
reference data associated with the plurality of elements describing properties of the parent subtree and the plurality of dependent subtrees;
identifying a plurality of leaf nodes in the parent subtree;
determining a first set of relationships between each leaf node in the parent subtree and at least one root node in a first dependent subtree of the plurality of dependent subtrees based on the reference data;
identifying each leaf node in each dependent subtree of the plurality of dependent subtrees;
determining a second set of relationships between each leaf node in each dependent subtree of the plurality of dependent subtrees and at least one root node in a subset of dependent subtrees of the plurality of dependent subtrees;
generating the unified tree structure based on the first set of relationships and the second set of relationships, the unified tree structure comprising a plurality of levels;
displaying a graphical user interface on a display device, wherein:
the graphical user interface comprises at least a first column, a second column, and a third column,
each of the first column, the second column, and the third column represents a different level of the plurality of levels of the unified tree structure,
each of the first column, the second column, and the third column includes a scroll function,
each of the first column, the second column, and the third column comprises one or more elements, and
each respective element of the one or more elements within each respective column of the first column, the second column, and the third column is associated with one or more of an ancestor element or a descendant element, based on a level of the respective column in the unified tree structure;
receiving, via the graphical user interface, a first user input selecting a first element from one of the first column, the second column, or the third column;
identifying one or more hierarchy paths associated with the selected first element in the unified tree structure, wherein the one or more hierarchy paths comprise:
all elements associated with the selected first element; and
at least one related ancestor element, at least one related descendent element, or at least one related ancestor element and at least one related descendent element based on a level of a column associated with the selected first element;
generating a visualization of the identified one or more hierarchy paths associated with the selected first element by:
automatically scrolling one or more of the first column, the second column, and the third column to view in the graphical user interface on the display device the at least one related ancestor element, the at least one related descendent element, or the at least one related ancestor element and at least one related descendent element based on the level of the column associated with the selected first element; and
highlighting the at least one related ancestor element, the at least one related descendent element, or the at least one related ancestor element and at least one related descendent element based on the level of the column associated with the selected first element.

8. The non-transitory computer-readable storage medium of claim 7, wherein each of the first column, the second column, and the third column corresponds to a hierarchy in a chart of accounts of an entity.

9. The non-transitory computer-readable storage medium of claim 8, wherein the elements in the chart of accounts comprises a hierarchical structure of the entity's financial accounts.

10. The non-transitory computer-readable storage medium of claim 7, wherein each of the first column, the second column, and the third column comprises a plurality of hierarchical groups, and wherein each hierarchical group of the plurality of hierarchical groups relates to the parent subtree or a subtree from the plurality of dependent subtrees.

11. The non-transitory computer-readable storage medium of claim 7, wherein the operation further comprises:
receiving, via the graphical user interface, a second user input selecting a second element from one of the first column, the second column, or the third column; and
creating a new relationship between a node associated with the first element and a node associated with the second element in the unified tree structure.

12. The non-transitory computer-readable storage medium of claim 11, wherein the operation further comprises:
identifying one or more hierarchy paths associated with the selected second element in the unified tree structure; and
generating a visualization of the identified one or more hierarchy paths associated with the selected second element.

13. A system, comprising:
a processor; and
a memory storing program code, which, when executed on the processor, performs an operation for generating a unified tree structure to present a visualization of a plurality of elements in an organized hierarchy structure, the operation comprising:
receiving a data set comprising:
a parent subtree;
a plurality of dependent subtrees; and
reference data associated with the plurality of elements describing properties of the parent subtree and the plurality of dependent subtrees;
identifying a plurality of leaf nodes in the parent subtree;
determining a first set of relationships between each leaf node in the parent subtree and at least one root node in a first dependent subtree of the plurality of dependent subtrees based on the reference data;

identifying each leaf node in each dependent subtree of the plurality of dependent subtrees;

determining a second set of relationships between each leaf node in each dependent subtree of the plurality of dependent subtrees and at least one root node in a subset of dependent subtrees of the plurality of dependent subtrees;

generating the unified tree structure based on the first set of relationships and the second set of relationships, the unified tree structure comprising a plurality of levels;

displaying a graphical user interface on a display device, wherein:

the graphical user interface comprises at least a first column, a second column, and a third column, each of the first column, the second column, and the third column represents a different level of the plurality of levels of the unified tree structure, each of the first column, the second column, and the third column includes a scroll function, each of the first column, the second column, and the third column comprises one or more elements, and each respective element of the one or more elements within each respective column of the first column, the second column, and the third column is associated with one or more of an ancestor element or a descendant element, based on a level of the respective column in the unified tree structure;

receiving, via the graphical user interface, a first user input selecting a first element from one of the first column, the second column, or the third column;

identifying one or more hierarchy paths associated with the selected first element in the unified tree structure, wherein the one or more hierarchy paths comprise:

all elements associated with the selected first element; and at least one related ancestor element, at least one related descendent element, or at least one related ancestor element and at least one related descendent element based on a level of a column associated with the selected first element;

generating a visualization of the identified one or more hierarchy paths associated with the selected first element by:

automatically scrolling one or more of the first column, the second column, and the third column to view in the graphical user interface on the display device the at least one related ancestor element, the at least one related descendent element, or the at least one related ancestor element and at least one related descendent element based on the level of the column associated with the selected first element; and highlighting the at least one related ancestor element, the at least one related descendent element, or the at least one related ancestor element and at least one related descendent element based on the level of the column associated with the selected first element.

14. The system of claim 13, wherein each of the first column, the second column, and the third column corresponds to a hierarchy in a chart of accounts of an entity.

15. The system of claim 14, wherein the elements in the chart of accounts comprises a hierarchical structure of the entity's financial accounts.

16. The system of claim 13, wherein each of the first column, the second column, and the third column comprises a plurality of hierarchical groups, and wherein each hierarchical group of the plurality of hierarchical groups relates to the parent subtree or a subtree from the plurality of dependent subtrees.

17. The system of claim 13, wherein the operation further comprises:

receiving, via the graphical user interface, a second user input selecting a second element from one of the first column, the second column, or the third column; and creating a new relationship between a node associated with the first element and a node associated with the second element in the unified tree structure.

18. The system of claim 17, wherein the operation further comprises:

identifying one or more hierarchy paths associated with the selected second element in the unified tree structure; and generating a visualization of the identified one or more hierarchy paths associated with the selected second element.

* * * * *